Dec. 13, 1932.          C. F. MARQUIS          1,891,102
                    MACHINE TOOL DEAD CENTER
                       Filed Dec. 28, 1929
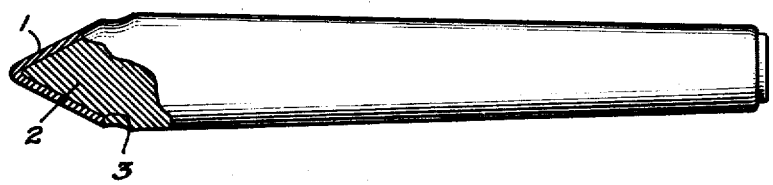
                                    Inventor:
                               Charles F. Marquis
                               by Charles V. Tullar
                                    His Attorney Patented Dec. 13, 1932

1,891,102

UNITED STATES PATENT OFFICE

CHARLES F. MARQUIS, OF SCHENECTADY, NEW YORK, ASSIGNOR TO GENERAL ELECTRIC COMPANY, A CORPORATION OF NEW YORK

MACHINE TOOL DEAD CENTER

Application filed December 28, 1929. Serial No. 417,209.

The present invention relates to that portion of a machine tool commonly known as the dead center. The dead center as the name implies, is a stationary spindle mounted so that the work to be turned rotates on it and not with it.

Heretofore, dead centers have ordinarily been made of tool steel, and prior to the advent of the new type of cutting tool disclosed in Schröter Patents Nos. 1,549,615 and 1,721,416, have been fairly satisfactory. With the advent of the new type of tool however, it has become possible to take relatively heavy cuts at speeds far in excess of the speeds ordinarily employed heretofore in machine tool work. When operating machine tools at such increased speeds however, great difficulty has been encountered in providing a durable dead center due to the greatly increased wear which takes place at high speed.

One of the objects of the present invention is to provide a dead center which is capable of substantially indefinite service without appreciable wear at high speeds.

The novel features which I believe to be characteristic of my invention are set forth with particularity in the appended claims. The invention itself however will best be understood from reference to the following specification when considered in connection with the accompanying drawing in which the single figure is a view partly in cross section and partly in elevation of a lathe dead center.

In carrying out my invention, tungsten carbide and cobalt in the proportion of about 3 to 20% cobalt and about 97 to 80% tungsten carbide are thoroughly mixed together. A small amount of paraffin, for example about 1%, is added to the mixture which is placed in a cone-shaped die or mold. A pressure of about 40 tons per square inch is then applied to the mixed material in the die through a cooperating cone-shaped die member. The material under pressure assumes the form of a cone. After it is removed from the die it is placed in a closed carbon tube and the latter heated in a hydrogen atmosphere to a sintering temperature of about 1375° C. The interior of the hollow, sintered cap or cone 1 is lapped on its inner surface so as to accurately fit on the cone-shaped end portion 2 of the lathe dead center, the latter being recessed slightly as indicated at 3 to accommodate the cap 1. The latter is mounted on the end portion 2 of the dead center and preferably properly braced or integrally secured thereto in a manner well known to those skilled in the art. The outside of the cone 1 may then be ground accurately on an abrasive wheel or in any other suitable manner. With a lathe spindle about 10" long the cap or cone 1 of hard, sintered material will have an altitude of about 1¼" and a thickness of about ⅛". The cone 1 comprises the work engaging portion of the dead center and is extremely hard, approaching the diamond in this respect, while the shank portion 3 of the dead center is made of material, such as tool steel, which is relatively soft with respect to the cap 1.

The material constituting the cap is known broadly as a cemented carbide. Such material is quite brittle and if unsupported by the softer foundation metal of the shank it easily might be broken. When properly supported however on the relatively soft shank, the hard metal cap provides a work supporting member which is capable of substantially indefinite service even at extremely high lathe speeds.

While I prefer to employ a mixture of tungsten carbide with an auxiliary cementing metal having a lower melting point than the carbide, such as cobalt, it will be obvious that other carbides and other cementing metals may be employed if desired.

The sintering temperature employed in making the cap, approximately 1380° C., is suitable for a composition containing about 13% cobalt. With varying amounts of cobalt however the sintering temperature would vary with the cobalt content.

I prefer to employ a small amount of paraffin with the mixed carbide and cobalt. While the presence of the paraffin improves the pressing properties of the mixed materials, its use is not absolutely essential and it may be omitted if desired.

What I claim as new and desire to secure by Letters Patent of the United States, is:

1. In a machine center, a work supporting member comprising a relatively soft metal shank having a conical end portion, a relatively hard metal conical cap of substantially uniform thickness throughout its extent mounted on said end portion and rigidly secured thereto.

2. In a machine center, a work supporting member comprising a relatively soft metal shank having a conical end portion, a relatively hard metal conical cap of substantially uniform thickness throughout its extent mounted on said end portion and rigidly secured thereto, the inner surface of said cap being substantially coextensive with the surface of said end portion.

3. In a machine center, a work supporting member comprising a relatively soft metal shank having a conical end portion, a conical cemented carbide cap of substantially uniform thickness throughout its extent mounted on said end portion, the inner surface of said cap being welded to said conical end portion.

4. A machine center comprising a shank having a relatively soft, substantially conical end portion and a coating of hard, tough metal covering said end portion and welded thereto.

In witness whereof, I have hereunto set my hand this 27th day of December 1929.

CHARLES F. MARQUIS.

CERTIFICATE OF CORRECTION.

Patent No. 1,891,102.                              December 13, 1932.

CHARLES F. MARQUIS.

It is hereby certified that error appears in the printed specification of the above numbered patent requiring correction as follows: Page 1, line 57, for "properly braced" read "copper brazed"; and that the said Letters Patent should be read with this correction therein that the same may conform to the record of the case in the Patent Office.

Signed and sealed this 14th day of February, A. D. 1933.

M. J. Moore,
Acting Commissioner of Patents.

(Seal)

by Letters Patent of the United States, is:

1. In a machine center, a work supporting member comprising a relatively soft metal shank having a conical end portion, a relatively hard metal conical cap of substantially uniform thickness throughout its extent mounted on said end portion and rigidly secured thereto.

2. In a machine center, a work supporting member comprising a relatively soft metal shank having a conical end portion, a relatively hard metal conical cap of substantially uniform thickness throughout its extent mounted on said end portion and rigidly secured thereto, the inner surface of said cap being substantially coextensive with the surface of said end portion.

3. In a machine center, a work supporting member comprising a relatively soft metal shank having a conical end portion, a conical cemented carbide cap of substantially uniform thickness throughout its extent mounted on said end portion, the inner surface of said cap being welded to said conical end portion.

4. A machine center comprising a shank having a relatively soft, substantially conical end portion and a coating of hard, tough metal covering said end portion and welded thereto.

In witness whereof, I have hereunto set my hand this 27th day of December 1929.

CHARLES F. MARQUIS.

CERTIFICATE OF CORRECTION.

Patent No. 1,891,102.   December 13, 1932.

CHARLES F. MARQUIS.

It is hereby certified that error appears in the printed specification of the above numbered patent requiring correction as follows: Page 1, line 57, for "properly braced" read "copper brazed"; and that the said Letters Patent should be read with this correction therein that the same may conform to the record of the case in the Patent Office.

Signed and sealed this 14th day of February, A. D. 1933.

(Seal)

M. J. Moore,
Acting Commissioner of Patents.

CERTIFICATE OF CORRECTION.

Patent No. 1,891,102.  December 13, 1932.

CHARLES F. MARQUIS.

It is hereby certified that error appears in the printed specification of the above numbered patent requiring correction as follows: Page 1, line 57, for "properly braced" read "copper brazed"; and that the said Letters Patent should be read with this correction therein that the same may conform to the record of the case in the Patent Office.

Signed and sealed this 14th day of February, A. D. 1933.

(Seal)

M. J. Moore,
Acting Commissioner of Patents.